United States Patent
Okhonko et al.

(10) Patent No.: US 10,460,025 B2
(45) Date of Patent: Oct. 29, 2019

(54) DETERMINING INFORMATION DESCRIBING OBJECTS MAINTAINED BY AN ONLINE SYSTEM BY APPLYING RULES TO INPUT RECEIVED VIA A FORM PROVIDED BY THE ONLINE SYSTEM

(71) Applicant: Facebook, Inc., Menlo Park, CA (US)

(72) Inventors: Dmytro Okhonko, London (GB); Palash Agarwal, Sunnyvale, CA (US); Atol Fortin de Oliveira, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 326 days.

(21) Appl. No.: 15/299,293

(22) Filed: Oct. 20, 2016

(65) Prior Publication Data

US 2018/0113944 A1    Apr. 26, 2018

(51) Int. Cl.
*G06F 3/0484*    (2013.01)
*G06F 17/24*    (2006.01)

(52) U.S. Cl.
CPC .................. *G06F 17/243* (2013.01)

(58) Field of Classification Search
CPC ...... G06F 3/048; G06F 3/0481; G06F 3/0484; G06F 17/24; G06F 17/243; G06F 17/30; G06F 17/30867; G06F 17/0873
See application file for complete search history.

(56) References Cited

U.S. PATENT DOCUMENTS

| | | | | |
|---|---|---|---|---|
| 9,461,972 | B1* | 10/2016 | Mehta | H04L 63/10 |
| 9,928,230 | B1* | 3/2018 | Jain | G06F 17/243 |
| 2002/0087525 | A1* | 7/2002 | Abbott | G06F 17/30867 |
| 2005/0086587 | A1* | 4/2005 | Balz | G06F 17/243 |
| | | | | 715/221 |
| 2008/0209037 | A1* | 8/2008 | Zernik | G06F 17/243 |
| | | | | 709/225 |
| 2017/0249592 | A1* | 8/2017 | Rossi | G06F 19/00 |

* cited by examiner

*Primary Examiner* — Xiomara L Bautista
(74) *Attorney, Agent, or Firm* — Fenwick & West LLP

(57) ABSTRACT

An online system provides one or more forms on which users provide information to the online system. A form includes various fields configured to receive input from the user. While entering information on a form presented by a client device, the client device transmits a request for content to the online system. The request identifies the user, the field, and the input received via the field. Upon receiving the request, the online system applies a set of rules to information identified in the request and characteristics of the user. Information describing objects included in rules having criteria satisfied by the information in the request and the characteristics of the user is communicated to the client device for presentation to the user in conjunction with the form.

20 Claims, 3 Drawing Sheets

DETERMINING INFORMATION DESCRIBING OBJECTS MAINTAINED BY AN ONLINE SYSTEM BY APPLYING RULES TO INPUT RECEIVED VIA A FORM PROVIDED BY THE ONLINE SYSTEM

BACKGROUND

This disclosure relates generally to providing information to an online system, and more specifically to selecting information describing objects maintained by an online system based on input provided by an online system user via a form provided by the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Various users of an online system provide information describing a content item to the online system, which generates the content item based on the provided information and subsequently presents the content item to other users of the online system. To encourage user interaction, online systems strive to streamline interactions for a user to provide information to the online system. For example, an online system provides its users with interfaces that seek to reduce a number of interactions to reach content, to reduce a number of characters a user inputs to provide content to the online system, or to reduce clutter when presenting content to users. Simplifying user interactions with an online system increases a likelihood that users interact with the online system; for example, simplifying an interface for providing content for generating a content item increases a likelihood of users providing information for generating content items to the online system.

However, users increasingly access online systems through client devices having input devices differing from traditional input devices, such as keyboards and mice. These different input devices limit the effectiveness of conventional techniques for simplifying user interaction with an online system. For example, conventional social networking systems are unable to effectively reduce the number of inputs (e.g., number of button presses or strokes) necessary for users to enter words or phrases for communication to the social networking system. Conventionally-used predictive text capabilities do not account for user-specific information, so they often do not suggest relevant words until after a user has entered a number of characters.

SUMMARY

An online system maintains one or more forms for presentation to its users, allowing a user to provide information to the online system by providing information to a form and communicating the form including the information to the online system. The form includes one or more fields that are each configured to receive input from a user when the form is presented to the user. For example, the form includes multiple fields for a user to provide information to the online system for creating or maintaining a content item. As an example, the form includes a field for receiving content for presentation via the content item, another field for receiving targeting criteria identifying characteristics of users eligible to be presented with the content item, and an additional field for receiving a bid amount specifying an amount of compensation the online system receives in exchange for presenting the content item.

However, having the user manually provide information in the fields of the presented form may cause errors from entry of the information or increase an amount of time for the user to provide information via the form. Errors in information provided via the form may impair subsequent presentation of a content item having characteristics specified by information received through the form, which may prevent the user from providing additional content items to the online system. For example, an error in specifying targeting criteria for the content item via the form causes a content item associated with the targeting criteria to be presented to fewer users or to incorrect users. Similarly, an increased amount of time for the user to provide characteristics of a content item to the online system from manually providing inputs to fields of the form may frustrate the user, preventing the user from providing inputs to various fields of the form or from providing additional content items via the form.

To simplify entry of information into the form, the online system maintains a set of rules, each rule including information identifying an object maintained by the online system and identifying criteria for presenting the information identifying the object. When at least a threshold amount of criteria included in a rule are satisfied, the information identifying the object included in the rule is eligible for presentation. The objects identified by a rule may be any information maintained by the online system. For example, a rule identifies content previously provided to the online system from a user, such as a content item or one or more characteristics of a content item provided to the online system. As another example, a rule identifies a user of the online system or one or more characteristics of the user. In other examples, a rule identifies an action performed by a user of the online system or a connection between users of the online system, As additional examples, an object identified by a rule describes performance of a content item previously presented to users by the online system, provides a measure of likely interaction with a content item having targeting criteria, provides one or more recommendations for characteristics of the content item based on previously presented content items or other data, or identifies potential errors in a field of the form based on characteristics of previously received content items.

When the online system communicates a form including one or more fields to a client device for presentation to a user, as the user provides input to a field of the form, the client device communicates a request for content to present in conjunction with the field. The request identifies the user, the field of the form, and the input received via the field. In some embodiments, the request also includes input received via other fields of the form. By comparing the information in the received request and characteristics of the user maintained by the online system to various rules in the set, the online system selects information describing one or more objects for presentation. For example, the online system selects information describing objects identified by one or more rules having at least a threshold amount of criteria satisfied by the information in the received request and the characteristics of the user. The online system communicates the selected information to the client device for presentation to the user in conjunction with the form.

For example, after receiving the selected information describing one or more objects, the client device presents a suggestion box in conjunction with the field that received input from the user. The suggestion box presents the selected information received from the online system and allows the user to identify selected information for inclusion in the field by interacting with the selected information. For example, the user selects information identifying an object presented in the suggestion box via an input device of the client device presenting the form, causing the information identifying the object to be included in the field.

In various embodiments, as a field of the form receives input from the user, the client device communicates requests to the online system, as described above, identifying the received input. For example, the client device communicates requests to the online system as input is received via the field, allowing the online system to dynamically select information identifying objects maintained by the online system as the user provides input to the field. As another example, the client device communicates a request to the online system after receiving input via the field and not receiving additional input from the user to the form (either to the field or to another field) for at least a threshold amount of time. Hence, the online system

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
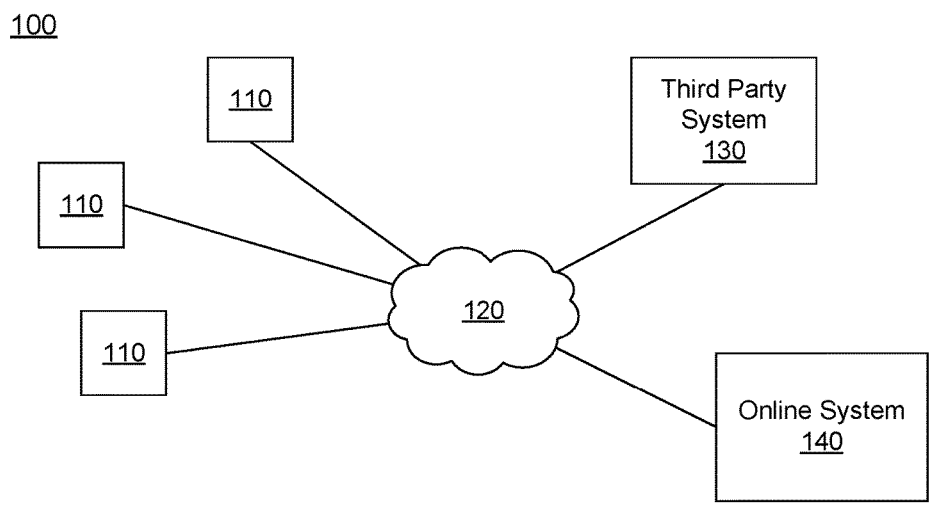
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
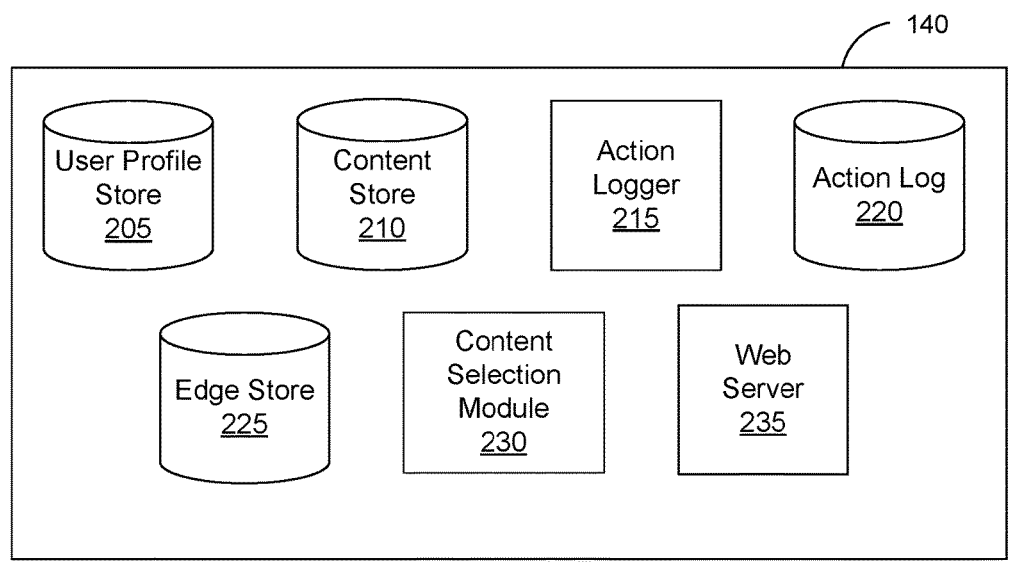
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

Additionally, the content selection module 230 may provide one or more forms to users of the online system 140 and generate content items stored in the content store 210 based on input received via a form. The content selection module 230 also accounts for information received via one or more forms for a content item when determining when to present the content item to users. A form maintained by the content selection module 230 and provided to one or more users includes one or more fields, with each field configured to receive input from a user via interaction with the field from a client device 110. An example form is further described below in conjunction with FIG. 3.

To simplify entry of information into a form, the content selection module 230 maintains a set of rules, each rule including information identifying an object maintained by the online system 140 and identifying criteria for presenting the information identifying the object. When at least a threshold amount of criteria included in a rule are satisfied, the information identifying the object included in the rule is eligible for presentation. Objects identified by a rule may be any information maintained by the online system 140 (e.g., information from the user profile store 205, the content store 210, the action log 220, or the edge store 225). For example, a rule identifies a content item from the content store 210 or one or more characteristics of a content item from the content store 210. As another example, a rule identifies a user of the online system 140 or one or more characteristics of the user from the user profile store 205, from the action log 220, or from the edge store 225. In other examples, a rule identifies an action from the action log 220 or a connection between users or between a user and an object from the edge store 225. In other examples, an object identified by a rule describes performance of a content item previously presented to users by the online system 140, provides a measure of likely interaction with a content item having targeting criteria, provides one or more recommendations for characteristics of the content item based on previously presented content items or other data, or identifies potential errors in a field of the form based on characteristics of previously received content items.

As the user provides input to a field of the form presented via the client device 110, the client device 110 communicates a request for content to present in conjunction with the field. The request identifies the user, the field of the form, and the input received via the field. In some embodiments, the request also includes input received via other fields of the form. The content selection module 230 retrieves characteristics of the user from the user profile store 205, the action log 220, and the edge store 225. Additionally, the content selection module 230 may retrieve content items from the content store 210 associated with the user and identify characteristics of the content items, which are also referred to herein as "characteristics of the user." By comparing the information in the received request and characteristics of the user maintained by the online system 140 to various rules in the set of rules, the content selection module 230 selects information describing one or more objects for presentation. For example, the content selection module 230 selects information describing objects identified by one or more rules having at least a threshold amount of criteria satisfied by the information in the received request and the characteristics of the user, as further described below in conjunction with FIG. 4. The content selection module 230 communicates the selected information to the client device 110 for presentation to the user in conjunction with the form. In some embodiments, the content selection module 230 receives indications from the client device 110 when information describing objects is no longer presented and modifies one or more of the rules based on the received indications.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Example Form for Receiving Input and Presenting Information Describing Objects

Figure 3:
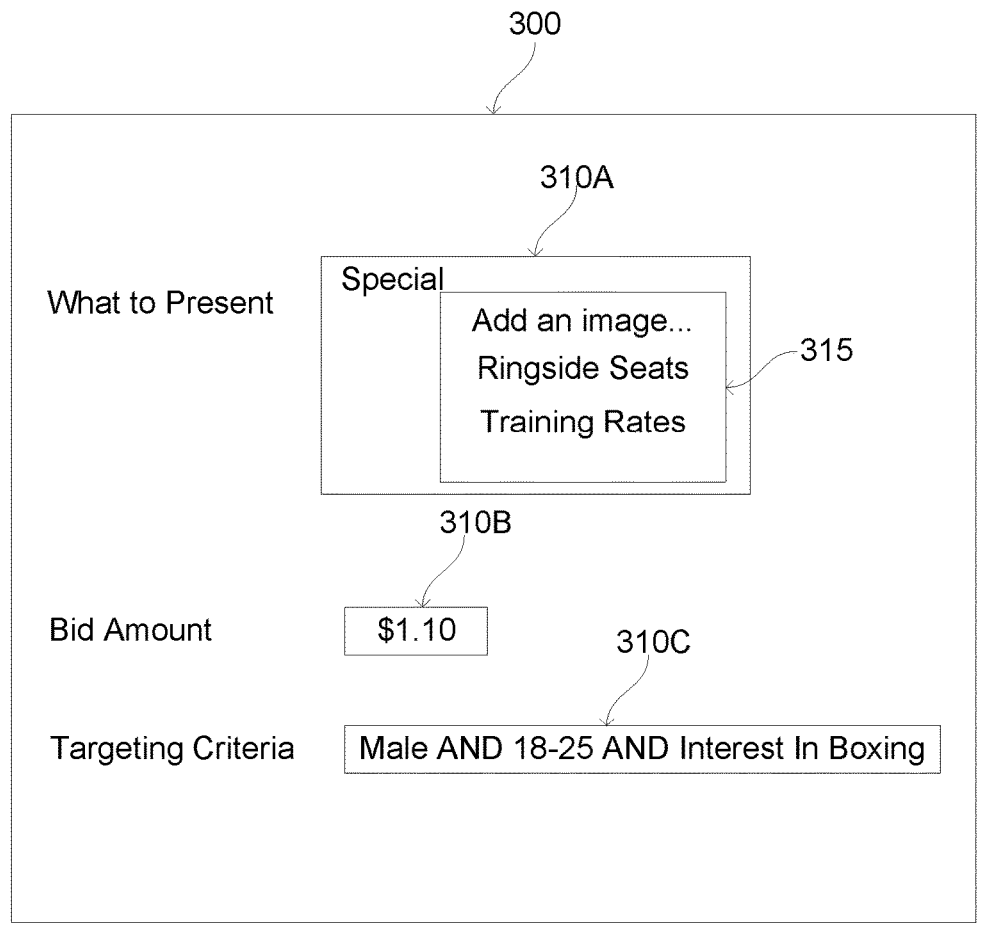
FIG. 3 is an example form including fields for a user to provide information to an online system, in accordance with an embodiment.

FIG. 3 is an illustration of an example form 300 for receiving input from a user of an online system 140 and for presenting information describing objects maintained by the online system 140 based on received input. In various embodiments, the form 300 may be displayed in various formats on different client devices 110 having different display devices (e.g., monitors, mobile device displays, tablet computer displays, etc.). The form 300 includes one or more fields 310A, 310B, 310C (also individually and collectively referred to using reference number 310). Each field is configured to receive input from a user to whom the form 300 is presented via a client device 110. The user may provide input to a field 310 using any suitable input method, such as any input device (e.g., a keyboard, a mouse, a touch-sensitive surfaces, an audio capture device, etc.) included on the client device 110 presenting the form 300. Different fields may receive different information. For example, field 310A receives content for presentation via a content item presented by the online system 140, field 310B receives a bid amount specifying an amount of compensation the online system 140 receives in exchange for presenting the content item, and field 310C receives targeting criteria identifying characteristics of online system users eligible to be presented with the content item.

As the user provides input to a field 310 of the form 300 via the client device 110 presenting the form, the client device 110 communicates a request for content to present in the field 310 to the online system 140 when the client device 110 receives input for the field 310. The request identifies the user, the field 310 of the form 300, and the input received via the field 310. In some embodiments, the request also identifies input received via other fields 310 of the form 300. As further described below in conjunction with FIG. 3, the online system 140 maintains a set of rules that select information describing one or more objects maintained by the online system 140 for presentation via the field 310. Each rule includes one or more criteria specifying characteristics of input received by the field 310, characteristics maintained by the online system 140 for the user, or characteristics of input received by other fields 310 of the form. When at least a threshold amount of criteria included in a rule are satisfied, information describing an object maintained by the online system 140 identified by the rule is eligible for presentation to the user. Hence, the rules allow the online system 140 to provide the user with information identifying particular objects maintained by the online system based on input received via the form and characteristics of the user. Objects maintained by the online system and specified by one or more rules may correspond to values for a field 310 of the form 300 previously received from the user or from other users, values for the field determined by the online system 140 from other content maintained or accessible by the online system, or any other suitable information.

By comparing the information in the received request and characteristics of the user maintained by the online system 140 to various rules in the set, the online system 140 selects information describing one or more objects for presentation. For example, the online system 140 selects information describing objects identified by one or more rules having at least a threshold amount of criteria satisfied by the information in the received request and the characteristics of the user. The online system 140 communicates the selected information to the client device 110 for presentation to the user in conjunction with the form 300.

In the example of FIG. 3, after receiving the selected information describing one or more objects, the client device 110 presents a suggestion box 315 in conjunction with the field 310A. The suggestion box 315 presents the selected information received from the online system 140 and allows the user to identify selected information for inclusion in the field 310A by interacting with the selected information. For example, the user selects information identifying an object presented in the suggestion box 315 via an input device of the client device 110 presenting the form, causing the information identifying the object to be included in the field 310A. The position and formatting of the suggestion box may be determined by instructions included in the form 300 that the client device 110 executes when presenting the form 300. Alternatively, instructions for presenting the suggestion box may be included with the selected information and received by the client device 110 along with the selected information, so the client device 110 executes the instructions after receiving the selected information.

One or more dimensions of the suggestion box 315 may change based on the number of objects included in the information received from the online system 140. For example, the height of the suggestion box 315 increases or decreases based on a number of objects included in the information received by the online system 140. Additional data, such as an indication the user previously provided an object identified by the selected information to the online system 140 within a threshold amount of time from a current time or provided the object to the online system 140 at least a threshold number of times may be presented in the suggestion box in conjunction with the selected information in various embodiments. For example, the online system 140 visually distinguishes information describing the objects in the preceding example using a different font or typeface than information describing other objects or by presenting an icon or image proximate to information describing the objects in the preceding example.

In various embodiments, as a field 310 receives input from the user, the client device 110 communicates requests to the online system 140, as described above, identifying the received input. For example, the client device 110 communicates requests to the online system 140 as input is received via the field 310, allowing the online system 140 to dynamically select information identifying objects maintained by the online system 140 as the user provides input to the field 310. As another example, the client device 110 communicates a request to the online system 140 after receiving input via the field 310 and not receiving additional input from the user to the form (either to the field 310 or to another field 310) for at least a threshold amount of time.

Figure 4:
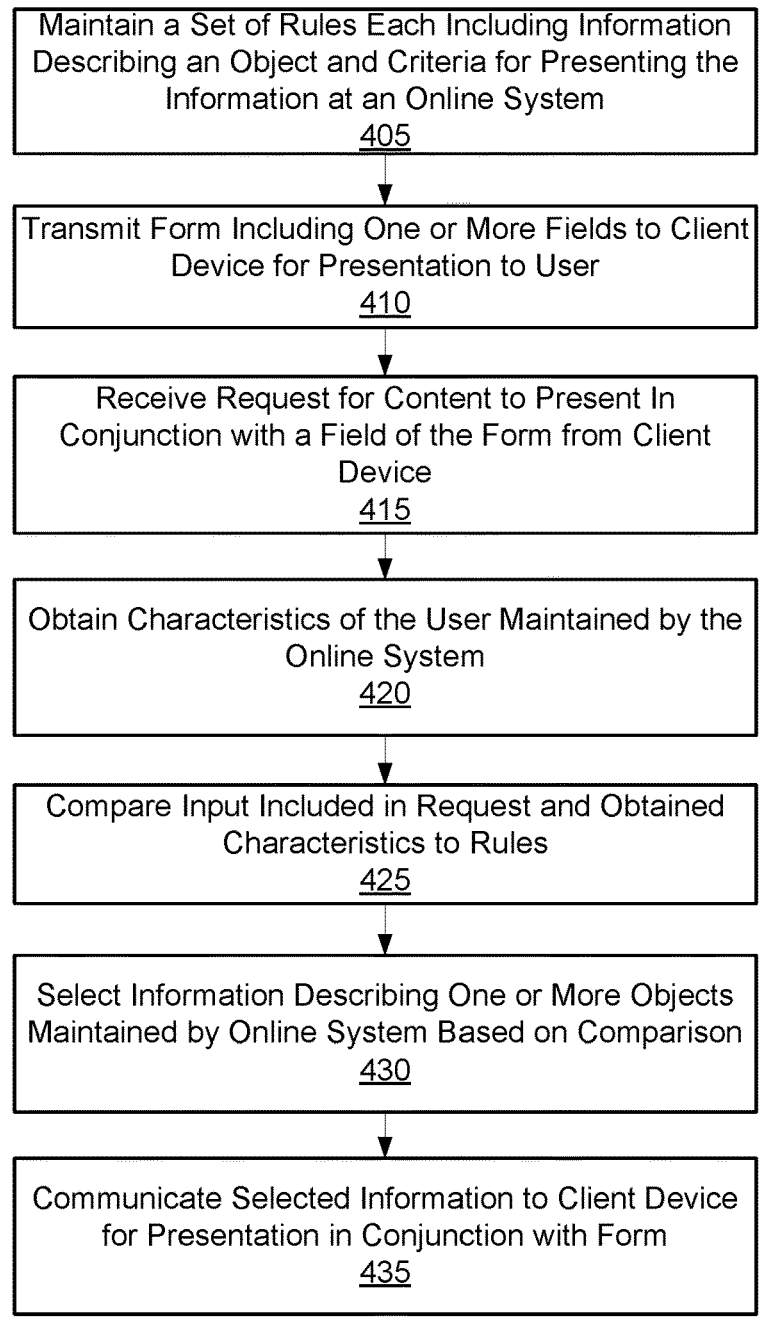
FIG. 4 is a flowchart of a method for identifying information describing objects maintained by an online system for presentation in conjunction with a form receiving input from an online system user, in accordance with an embodiment.

Selecting Information Describing Objects for Presentation in Conjunction with a Form FIG. 4 is a flowchart of one embodiment of a method for identifying information describing objects maintained by an online system 140 for presentation in conjunction with a form receiving input from an online system user. In other embodiments, the method may include different and/or additional steps than those shown in FIG. 4. Additionally, steps of the method may be performed in different orders than the order described in conjunction with FIG. 4 in various embodiments.

The online system 140 maintains 405 a set of rules, each rule including information identifying an object maintained by the online system 140 and identifying criteria for presenting the information identifying the object. When at least a threshold amount of criteria included in a rule are satisfied, the information identifying the object included in the rule is eligible for presentation. The objects identified by a rule may be any information maintained by the online system 140. For example, a rule identifies content previously provided to the online system 140 from a user, such as a content item or one or more characteristics of a content item provided to the online system 140. As another example, a rule identifies a user of the online system 140 or one or more characteristics of the user. In other examples, a rule identifies an action performed by a user of the online system 140 or a connection between users of the online system 140. In other examples, a rule identifies an action performed by a user of the online system or a connection between users of the online system 140. As additional examples, an object identified by a rule describes performance of a content item previously presented to users by the online system, provides a measure of likely interaction with a content item having targeting criteria, provides one or more recommendations for characteristics of the content item based on previously presented content items or other data, identifies potential errors in a field of the form based on characteristics of previously received content items, or identifies potential errors in a field of the form based on policies applied by the online system 140.

To allow users of the online system 140 to more easily provide information, the online system 140 presents 410 a form to a user via a client device 110. In various embodiments, the online system 140 transmits the form to a client device 110 that presents the form to the user. The form includes one or more fields each configured to receive input from the user, as shown in the example described above in conjunction with FIG. 3. In various embodiments, a field may receive different types of input. For example, a field may be configured to receive text data, image data, video data, audio data, or any combination thereof. Additionally, different fields may correspond to different characteristics of a content item maintained by the online system 140. For example, different fields of the form correspond to content for presentation via a content item, targeting criteria identifying characteristics of users eligible to be presented with the content item, and a bid amount specifying an amount of compensation the online system 140 receives in exchange for presenting the content item.

However, having the user manually provide information in the fields of the presented form may cause errors from entry of the information or increase an amount of time for the user to provide information via the form. Errors in information provided via the form may impair subsequent presentation of a content item having characteristics specified by information received through the form, which may prevent the user from providing additional content items to the online system 140. For example, an error in specifying targeting criteria for the content item via the form causes a content item associated with the targeting criteria to be presented to fewer users or to incorrect users. Similarly, an increased amount of time for the user to provide characteristics of a content item to the online system 140 from manually providing inputs to fields of the form may frustrate the user, preventing the user from providing inputs to various fields of the form or from providing additional content items via the form.

To simplify the online system 140 receiving content from the user via the form, the form includes instructions that, when executed by the client device 110 presenting 410 the form, communicate a request for content for presentation in conjunction with a field of the form. In various embodiments, the client device 110 transmits the request to the online system 140 in response to the user receiving input to a field of the form. For example, the client device 110 transmits the request to the online system 140 as input is received via the field. As another example, the client device 110 transmits the request after receiving input via the field and not receiving additional input for at least a threshold amount of time. The request includes information identifying the user, as well as information identifying the received input and the field that received the input.

When the online system 140 receives 415 the request for content from the client device 110, the online system 140 obtains 420 characteristics of the user identified by the request. As further described above in conjunction with FIG. 2, the online system 140 maintains various characteristics associated with the user. Example characteristics of a user maintained by the online system 140 include demographic information (e.g., age, location, gender, etc.), connections between the user and other users, content items associated with the user (e.g., content items the user previously provided to the online system 140), and actions performed by the user and identified to the online system 140. Characteristics of the user also include characteristics of content items associated with the user by the online system 140, such as characteristics of content items the user provided to the online system 140. Example characteristics of a content item associated with the user include text data, image data, video data, or audio data included in a content item, targeting criteria associated with a content item, a bid amount associated with a content item, or any other suitable information.

The online system 140 compares 425 the input included in the field of the form from the request and the obtained characteristics to one or more of the set of rules and selects 430 information identifying one or more objects maintained by the online system 140 based on the comparison. For example, the online system 140 compares 425 the obtained characteristics and the input included in the field to criteria included in various rules and determines one or more rules including at least a threshold amount (e.g., a threshold percentage, a threshold number, etc.) of criteria satisfied by the obtained characteristics and the input included in the field of the form. In some embodiments, the request includes input included in additional fields of the form and the online system 140 also compares 425 the input included in the additional fields to criteria included in various rules. The online system 140 selects 430 information identifying one or more objects maintained by the online system 140 included in the determined rules.

Alternatively, the online system 140 compares 425 the obtained characteristics and the input included in the field to criteria included in various rules and ranks at least a group of the rules based on amounts of criteria included in various rules satisfied by the obtained characteristics and by the input included in the field. The online system 140 selects 430 information identifying one or more objects included in rules having at least a threshold position in the ranking. For example, the online system 140 selects 430 information identifying an object included in a rule having a maximum position in the ranking.

In some embodiments, different groups of rules are associated with different fields of the form, so the online system 140 identifies the field of the form that received input from the request and selects a group of rules associated with the identified field. The online system 140 compares 425 the obtained characteristics and the input included in the field to criteria included in each rule of the group and selects 430 information describing an object based on the comparison, as further described above. Associating different groups of rules with different fields allows the online system 140 to more particularly select 430 information describing objects maintained by the online system 140 based on the field that received input from the user.

The online system 140 communicates 435 the selected information describing the object to the client device 110 from which the request was received for presentation in conjunction with the form. For example, the selected information is presented by the client device 110 in conjunction with the form and proximate to the field that received input from the user, as shown in the example of FIG. 3, further described above. The user may access the selected information presented by the client device 110 to include the object described by the selected information in the field, simplifying entry of data into the field by the user.

In various embodiments, as the field receives additional input from the user, the client device 110 transmits additional requests for content to the online system 140. The additional requests identify the user, the field, and the additional input from the user. Based on the additional requests, the online system 140 compares 425 the additional input from the request and the obtained characteristics of the user to various rules, selects 430 information describing an object based on the comparison, and communicates 435 the selected information to the client device 110, as further described above. This allows the online system 140 to dynamically modify the selected information describing the object presented to the user as the user provides input to the field.

The online system 140 may also receive information describing use of the selected information describing the object presented via the form, allowing the online system 140 to modify various rules for selecting information describing objects based on usage of information identifying various objects presented to various users. In various embodiments, the form includes instructions that, when executed by the client device 110 presenting the form, communicate a time when selected information describing an object is no longer presented by the client device 110. Alternatively, the online system 140 communicates 435 the instructions to the client device along with the selected information describing objects. For example, the client device 110 transmits an indication that information describing an object is no longer presented by the client device 110 in response to a user selecting the information describing the object so the information is included in the field. This allows the online system 140 to infer that the information describing the object was used to complete the form based on receiving the indication. In other embodiments, the client device 110 transmits the indication or in response to the information describing the object no longer being presented by the client device 110 for any suitable reason.

In other embodiments, the online system 140 associates an identifier with each objected identified by a rule, allowing the online system 140 to uniquely identify each object identified by a rule. The online system 140 communicates 435 the identifiers associated with objects to the client device 110 included in the selected information in conjunction with the information describing each object described by the selected information. Instructions included in the form, or communicated 430 with the selected information describing the one or more objects, when executed by the client device 110 transmit an identifier of an object described by information communicated 435 to the client device 110 and a time when the information describing the object corresponding to the identifier is included in the field or is otherwise no longer presented by the client device 110. Based on the received information, the online system 140 determines if the user used the information describing the object to complete the form and modifies one or more of the rules based on the determination. For example, the online system 140 adds or removes criteria from a rule identifying the object described by the information communicated 435 to the client device 110 if the user included the information identifying the object in the field. This allows the online system 140 to identify rules including information describing objects that were selected by users, allowing the online system 140 to more accurately identify information describing objects that users are more likely to select when completing the form, simplifying subsequent completion of the form by various users.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining a set of rules at an online system, each rule identifying criteria for presenting information describing one or more objects maintained by the online system;
   transmitting a form to a client device for presentation to a user of the online system via the client device, the form including one or more fields configured to receive from the user a set of parameters for use by the online system to distribute media from the user to one or more other users of the online system;
   after the user has inputted one or more of the parameters and before the user has submitted the form, receiving a request for tip content to present in conjunction with a field of the form from the client device, the request including the inputted parameters received via the one or more fields of the form;
   obtaining characteristics of the user from information from a data store maintained by the online system, the characteristics describing a previous distribution of the user's media by the online system;
   applying the set of rules to inputted parameters included in the one or more fields of the form and the obtained characteristics, where the set of rules identifies a tip associated with a field of the one or more fields; and
   communicating the tip to the client device for presentation in the form in conjunction with the field associated with the tip.

2. The method of claim 1, wherein applying the set of rules to inputted parameters included in the one or more fields of the form and the obtained characteristics comprises:
   determining a rule including at least a threshold amount of criteria satisfied by the inputted parameters included in the one or more fields of the form and the obtained characteristics;
   selecting information describing objects maintained by the online system identified by the determined rule.

3. The method of claim 1, wherein applying the set of rules to inputted parameters included in the one or more fields of the form and the obtained characteristics comprises:
   ranking at least a set of rules based on an amount of criteria identified by each of the set of rules satisfied by the inputted parameters included in the one or more fields of the form and the obtained characteristics; and
   selecting information describing objects maintained by the online system identified by a rule having a threshold position in the ranking.

4. The method of claim 1, further comprising:
   receiving information from the client device indicating a time when the tip is no longer presented by the client device.

5. The method of claim 1, wherein information describing each object identified by a rule is associated with an identifier.

6. The method of claim 5, further comprising:
   receiving information from the client device including an identifier of an object described by the tip in response to the selected information no longer being presented by the client device.

7. The method of claim 6, further comprising:
   modifying one or more of the rules based on the received information.

8. The method of claim 1, wherein the inputted parameters included in the one or more fields of the form describe one or more characteristics of a tip content item for presentation by the online system.

9. The method of claim 8, wherein the inputted parameters included in the one or more fields of the form are selected from a group consisting of: tip content for presentation by the tip content item, targeting criteria identifying characteristics of users eligible to be presented with the tip content item, and a bid amount specifying an amount of compensation received by the online system for presenting the tip content item.

10. The method of claim 9, wherein an object described by a rule is selected from a group consisting of: a performance of another tip content item previously presented to users of the online system, a measure of interaction with the tip content item based on the targeting criteria, one or more recommendations for characteristics of the tip content item based on previously presented tip content items, indications of potential errors in the inputted parameters based on characteristics of previously received tip content items, or any combination thereof.

11. A computer program product comprising a non-transitory computer readable storage medium having instructions encoded thereon that, when executed by a processor, cause the processor to:
   maintain a set of rules at an online system, each rule identifying criteria for presenting information describing one or more objects maintained by the online system;
   transmit a form to a client device for presentation to a user of the online system via the client device, the form including one or more fields configured to receive from the user a set of parameters for use by the online system to distribute media from the user to one or more other users of the online system;
   after the user has inputted one or more of the parameters and before the user has submitted the form, receive a request for tip content to present in conjunction with a field of the form from the client device, the request including the inputted parameters received via the one or more fields of the form;
   obtain characteristics of the user from information from a data store maintained by the online system, the characteristics describing a previous distribution of the user's media by the online system;
   apply the set of rules to inputted parameters included in the one or more fields of the form and the obtained characteristics, where the set of rules identifies a tip associated with a field of the one or more fields; and communicate the tip to the client device for presentation the form in conjunction with the field associated with the tip.

12. The computer program product of claim 11, wherein apply the set of rules to inputted parameters included in the one or more fields of the form and the obtained characteristics comprises:

determine a rule including at least a threshold amount of criteria satisfied by the inputted parameters included in the one or more fields of the form and the obtained characteristics select information describing objects maintained by the online system identified by the determined rule.

13. The computer program product of claim 11, wherein apply the set of rules to inputted parameters included in the one or more fields of the form and the obtained characteristics comprises:

rank at least a set of rules based on an amount of criteria identified by each of the set of rules satisfied by the inputted parameters included in the one or more fields of the form and the obtained characteristics; and select information describing objects maintained by the online system identified by a rule having a threshold position in the ranking.

14. The computer program product of claim 11, wherein the computer readable storage medium further has instructions encoded thereon that, when executed by the processor, cause the processor to:

receive information from the client device indicating a time when the tip is no longer presented by the client device.

15. The computer program product of claim 11, wherein information describing each object identified by a rule is associated with an identifier.

16. The computer program product of claim 15, wherein the computer readable storage medium further has instructions encoded thereon that, when executed by the processor, cause the processor to:

receive information from the client device including an identifier of an object described by the tip in response to the selected information no longer being presented by the client device.

17. The computer program product of claim 16, wherein the computer readable storage medium further has instructions encoded thereon that, when executed by the processor, cause the processor to:

modify one or more of the rules based on the received information.

18. The computer program product of claim 11, wherein the inputted parameters included in the one or more fields of the form describe one or more characteristics of a tip content item for presentation by the online system.

19. The computer program product of claim 18, wherein the inputted parameters included in the one or more fields of the form are selected from a group consisting of: tip content for presentation by the tip content item, targeting criteria identifying characteristics of users eligible to be presented with the tip content item, and a bid amount specifying an amount of compensation received by the online system for presenting the tip content item.

20. The computer program product of claim 19, wherein an object described by a rule is selected from a group consisting of: a performance of another tip content item previously presented to users of the online system, a measure of interaction with the tip content item based on the targeting criteria, one or more recommendations for characteristics of the tip content item based on previously presented tip content items, indications of potential errors in the inputted parameters based on characteristics of previously received tip content items, or any combination thereof.

* * * * *

UNITED STATES PATENT AND TRADEMARK OFFICE
CERTIFICATE OF CORRECTION

PATENT NO. : 10,460,025 B2
APPLICATION NO. : 15/299293
DATED : October 29, 2019
INVENTOR(S) : Dmytro Okhonko et al.

Page 1 of 1

It is certified that error appears in the above-identified patent and that said Letters Patent is hereby corrected as shown below:

In the Claims

Column 18, Line 8, Claim 5, delete "information" and insert -- the information --.

Column 19, Line 21, Claim 13, delete "rank" and insert -- ranking --.

Signed and Sealed this
Twenty-second Day of September, 2020

Andrei Iancu
*Director of the United States Patent and Trademark Office*